(12) United States Patent
Katayama

(10) Patent No.: US 9,254,970 B2
(45) Date of Patent: Feb. 9, 2016

(54) COVER FOR SLIDER OF LINEAR CONVEYER, LINEAR CONVEYER, SLIDER ASSEMBLY, AND METHOD OF DETACHING COVER FROM SLIDER OF LINEAR CONVEYER

(71) Applicant: YAMAHA HATSUDOKI KABUSHIKI KAISHA, Shizuoka (JP)

(72) Inventor: Manabu Katayama, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/448,967

(22) Filed: Jul. 31, 2014

(65) Prior Publication Data

US 2015/0060236 A1    Mar. 5, 2015

(30) Foreign Application Priority Data

Aug. 30, 2013    (JP) .................................. 2013-180191

(51) Int. Cl.
| | |
|---|---|
| *B65G 54/02* | (2006.01) |
| *H02K 41/03* | (2006.01) |
| *B65G 35/06* | (2006.01) |
| *H02K 7/08* | (2006.01) |

(52) U.S. Cl.
CPC ................ *B65G 54/02* (2013.01); *B65G 35/06* (2013.01); *H02K 41/031* (2013.01); *H02K 7/08* (2013.01)

(58) Field of Classification Search
CPC .... B65G 21/2009; B65G 21/22; B65G 23/18; B65G 23/23; B65G 35/06; B65G 54/02; H01K 41/031; H01K 7/08
See application file for complete search history.

(56) References Cited

U.S. PATENT DOCUMENTS

| | | | |
|---|---|---|---|
| 2013/0082544 A1* | 4/2013 | Kaneshige | ........... H02K 41/031 310/12.21 |
| 2015/0027860 A1* | 1/2015 | Kleinikkink | ......... B65G 54/023 198/867.01 |

FOREIGN PATENT DOCUMENTS

JP    2005-312228 A    11/2005

* cited by examiner

*Primary Examiner* — Leslie A Nicholson, III
*Assistant Examiner* — Keith R Campbell
(74) *Attorney, Agent, or Firm* — Studebaker & Brackett PC

(57) ABSTRACT

A cover for a linear conveyer. The linear conveyer including a stationary module having a rail extending linearly and a stator including armature coils that is fixed to the rail, and a slider including a mover component having magnetic poles arranged linearly and a rail guide that is fitted on the rail. The slider sliding from an end surface of the rail along an elongated direction of the rail to be arranged on the rail and moving on the rail by a linear motor. The cover is attached to the slider to cover a magnetic pole face of the mover component of the slider. The cover has a thickness so as to come in contact with an end portion of the stationary module when the slider is mounted on the rail. The cover is detached from the slider by the contact with the end portion of the stationary module.

20 Claims, 17 Drawing Sheets

US 9,254,970 B2

COVER FOR SLIDER OF LINEAR CONVEYER, LINEAR CONVEYER, SLIDER ASSEMBLY, AND METHOD OF DETACHING COVER FROM SLIDER OF LINEAR CONVEYER

CROSS REFERENCE TO RELATED APPLICATION

This application claims benefit of priority to Japanese Patent Application No. 2013-180191 filed Aug. 30, 2013, the entire content of which is incorporated herein by reference.

TECHNICAL FIELD

The present disclosure relates to a cover for a slider of a linear conveyer, a linear conveyer, a slider assembly and a method of detaching the cover from a slider of a linear conveyer.

BACKGROUND

A linear conveyer including a slider that moves along a rail has been used. The slider is a platform car that conveys parts. Such a linear conveyer includes, for example, a unit-type stationary module and the slider. The stationary module includes a rail that linearly extends and a stator including armature coils and is fixed to the rail. The slider includes a rail guide that is fitted to the rail and a mover that faces the stator when the rail guide is fitted to the rail. The mover includes permanent magnets to generate magnetic poles.

In such a linear conveyer, the slider may be detached from the rail to store the slider or perform a maintenance operation for the slider, and the slider may be mounted to the rail. If the slider is detached from the rail and moved closer to the stationary module, the slider may be abruptly attracted to the stationary module due to the powerful magnetic attractive force that is generated between the stator and the mover by the quite strong force of the permanent magnets included in the mover. Therefore, a finger or a hand may be caught between the slider and the stationary module. This may cause a serious problem in safety. If the slider is left detached from the rail, steel components such as bolts or tools may be carelessly attracted and attached to the magnetic pole face of the mover. The attracted steel components must be separated from the mover and this deteriorates workability.

There has been an assembling fixture that is used in assembly of a linear motor driving mechanism/linearly moving mechanism. The assembling fixture is a non-magnetic member and is fixed to a slider with bolts to cover the magnetic pole faces of the mover. Thus, the magnetic pole faces of the mover are covered with the non-magnetic assembling fixture. With such a configuration, the magnetic pole faces of the mover are less likely to move carelessly closer to the stationary module or other steel components and the magnetic attractive force is less likely to increase abruptly, and the above problems do not occur.

SUMMARY

An objective of the present technology is to provide a cover for a slider of a linear conveyer, a linear conveyer, a slider assembly and a method of detaching the cover from a slider of a linear conveyer that improve workability and ensures safety in operations of mounting and detaching a slider.

A cover for a linear conveyer according to the present technology is disclosed. The linear conveyer includes a stationary module including a rail extending linearly and a stator including armature coils that is fixed to the rail. A slider includes a mover component having magnetic poles arranged linearly and a rail guide that is fitted to the rail. The slider slides from an end surface of the rail along an elongated direction of the rail to be arranged on the rail and moves on the rail by a linear motor. The cover is attached to the slider to cover a magnetic pole face of the mover component of the slider, the cover has a thickness so as to come in contact with an end portion of the stationary module when the slider is mounted to the rail. The cover is detached from the slider by the contact with the end portion of the stationary module.

DETAILED DESCRIPTION

The assembling fixture described above is fixed to the slider with bolts. To ensure safety in the maintenance operation of the slider, the following operations are necessary to be performed. When the slider is detached from the rail, right after the slider is detached from the rail, the assembling fixture is necessarily mounted to the slider and fixed with bolts. When the slider is mounted to the rail, the bolts are previously required to be loosened and the assembling fixture is detached from the slider. This deteriorates the workability of the maintenance operation of the slider. Further, in the slider from which the assembling fixture is detached, the magnetic pole face of the mover is uncovered. Therefore, in such a state, a finger or a hand may be caught between the magnetic poles and the stator and a tool may be attracted to the magnetic pole face in the mounting operation of the slider onto the rail. The above configuration does not eliminate such dangerous problems. Further, if the slider to which the assembling fixture is attached is mounted to the rail by mistake, the assembling fixture may come in contact with the stator when the linear conveyer is activated, and this may damage the stator or the mover.

First Embodiment

Overall Configuration of Linear Conveyer

A first embodiment of the present technology will be described with reference to the drawings. In this embodiment, a linear conveyer 1 that is driven by a linear motor will be described. X-axes, Y-axes, and Z-axes are in some drawings. Directions indicated by the axes in each drawing correspond to directions indicated by the respective axes in other drawings. An X-axis direction corresponds to a moving direction of the linear conveyer 1 and a Z-axis direction corresponds to a vertical direction.

Figure 1:
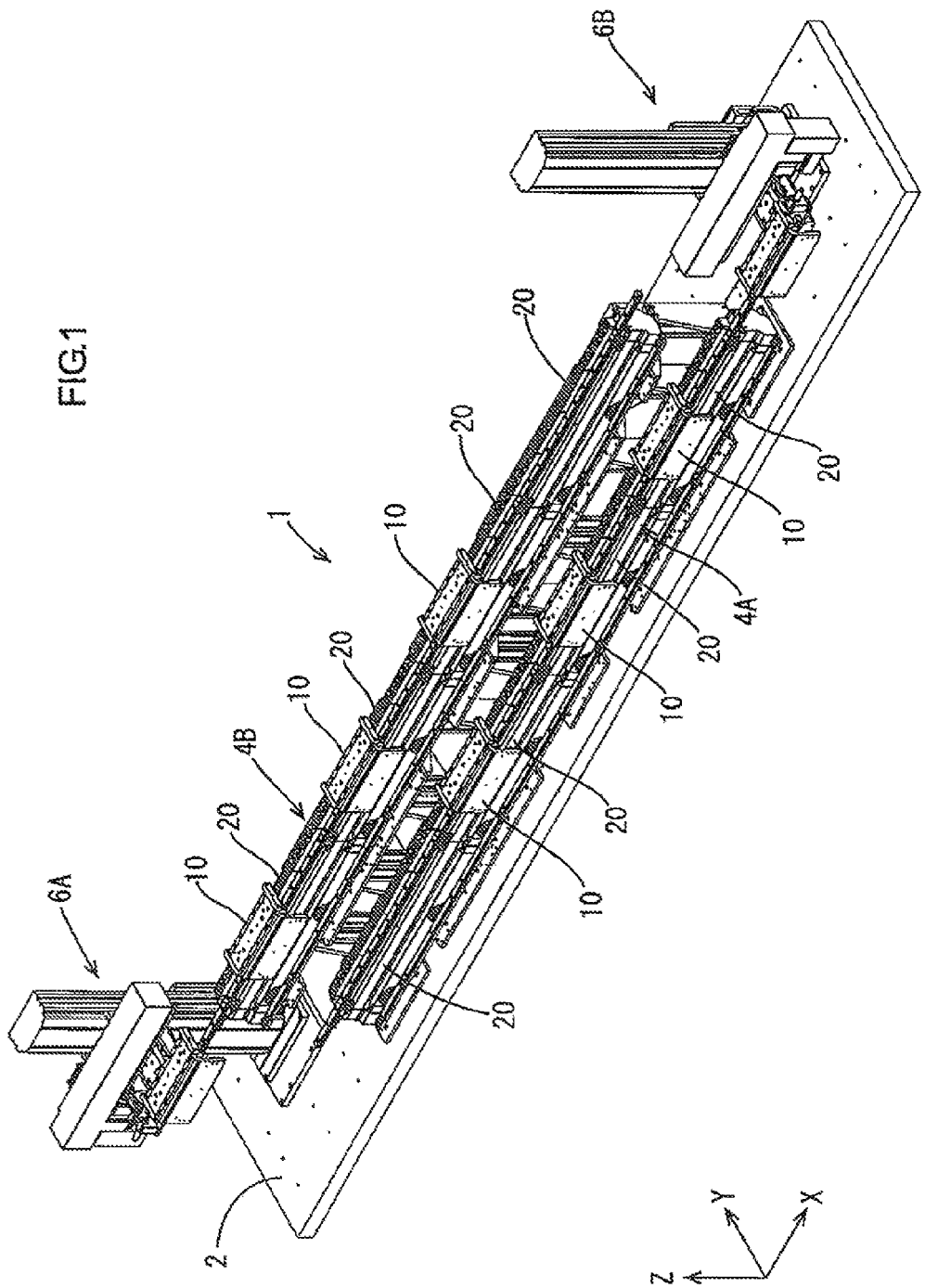
FIG. 1 is a perspective view illustrating a linear conveyer.

As illustrated in FIG. 1, the linear conveyer 1 is arranged on a base 2 and includes two linear conveyance units 4A, 4B that extend in the X-axis direction and arranged at two levels including an upper level and a lower level, respectively. A plurality of sliders 10 are mounted to each of the linear conveyance units 4A, 4B and move in the X-axis direction. Slider lift-up and lowering devices 6A, 6B are arranged at two end sides of each linear conveyance unit 4A, 4B, respectively.

The two linear conveyance units 4A, 4B have a same length and are arranged to overlap each other with respect to a vertical direction. When the slider 10 moves along one of the linear conveyance units 4A (4B) and reaches one end of the linear conveyance unit 4A, the slider 10 is moved and placed on the slider lift-up and lowering device 6A (6B) and lifted up (lowered) to one end of another one of the linear conveyance units 4B (4A). The slider 10 reverses its moving direction and moves along another one of the linear conveyance units 4B (4A). The linear conveyer 1 includes a looped conveyance path of the slider 10 including the two conveyance units 4A, 4B and the two slider lift-up and lowering devices 6A, 6B.

In the linear conveyer 1 with such a configuration, the slider 10 stops at a certain work position on the conveyance path and a part is attached to a work on the slider 10, or screws are tightened, or sealing may be performed.

(Configuration of Stationary Module)

Figure 2:
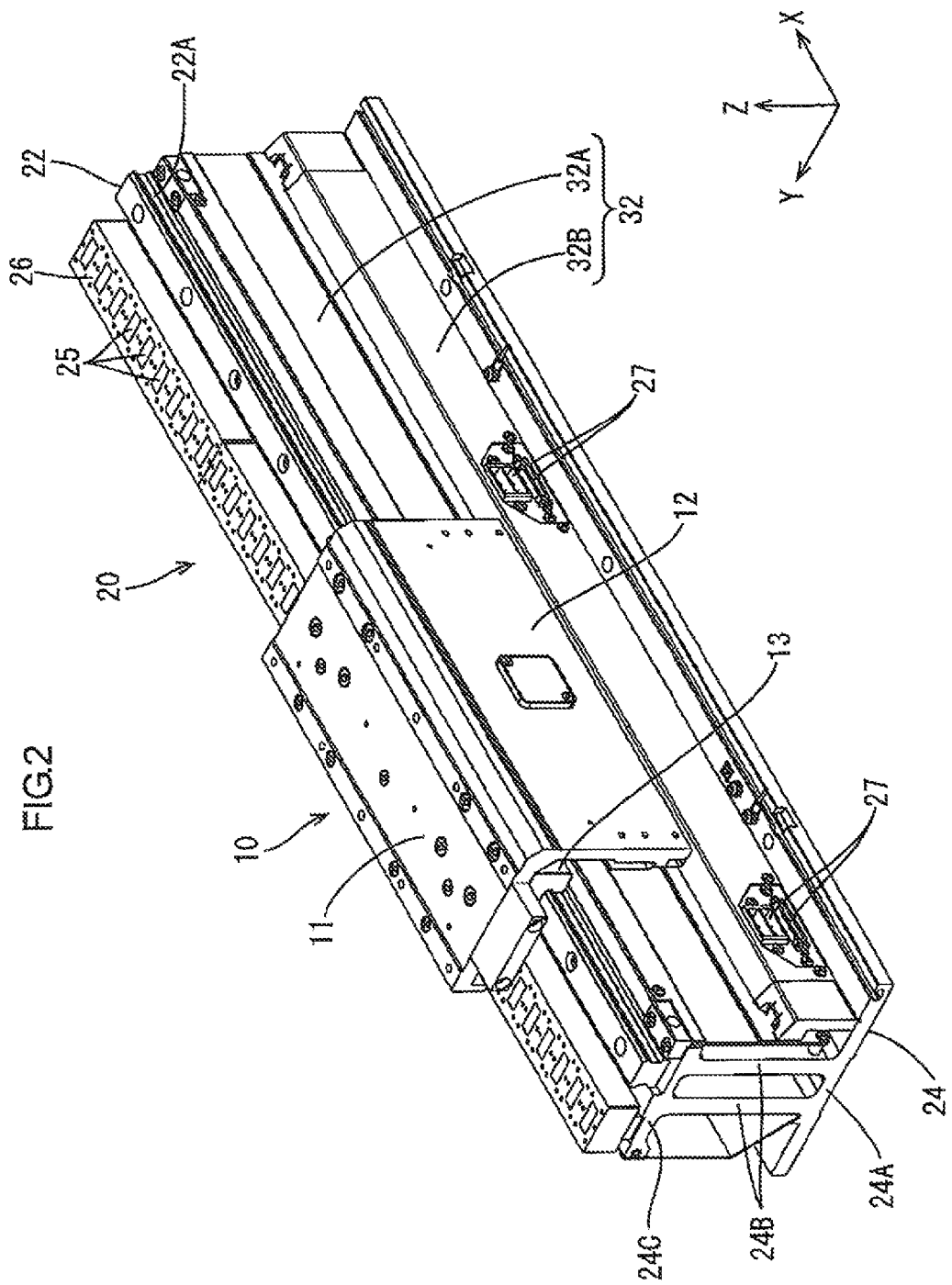
FIG. 2 is a perspective view illustrating a stationary module to which a slider is mounted.

Each linear conveyance unit 4A, 4B includes four stationary modules 20 that are connected to each other along a moving direction of the slider 10. As illustrated in FIG. 2, each of the stationary modules 20 includes a rail 22 that extends in the moving direction in which the slider 10 moves (the X-axis direction), a frame 24, and a stator 26 of a linear motor.

Figure 3:
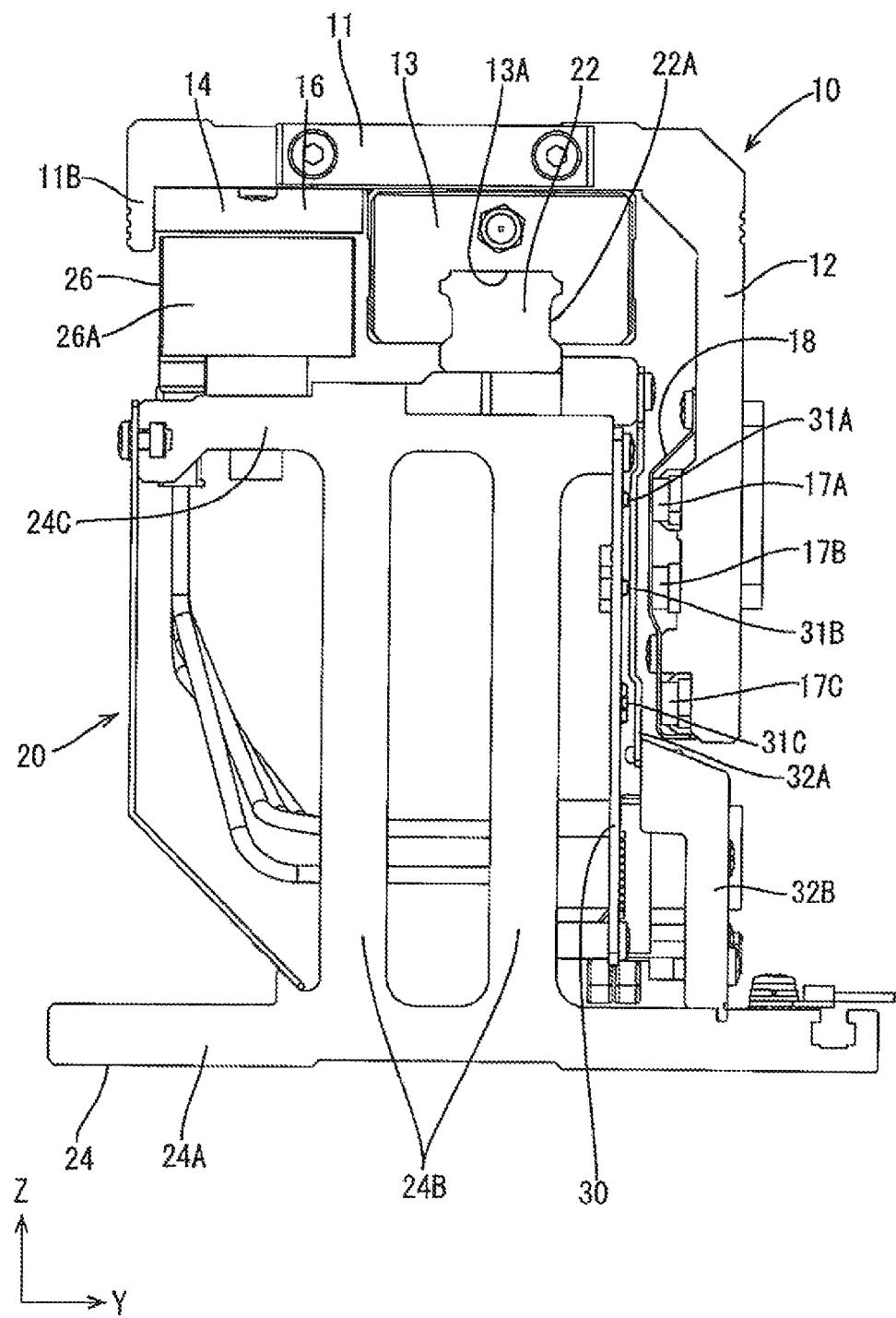
FIG. 3 is a side view illustrating the stationary module to which the slider is mounted.

As illustrated in FIGS. 2 and 3, the frame 24 is obtained by cutting an extrusion molded object made of aluminum alloy into several pieces each having a certain length, and the frame 24 has an elongated base seat shape that extends in a right and left direction along the moving direction in which the slider 10 moves. The frame 24 includes a mount portion 24A, support portions 24B, and a rail fixing portion 24C. The mount portion 24A is arranged on the base 2. The support portions 24B rise upward from a middle portion of the mount portion 24A with respect to a width direction of the frame 24 (the Y-axis direction). The rail fixing portion 24C is provided on upper ends of the support portions 24B. The mount portion 24A is a flat plate that is parallel to a plate surface of the base 2 so as to be arranged on the base 2. The support portions 24B rise substantially vertically from the mount portion 24A and are two flat plate members whose plate surfaces face toward the width direction of the frame 24 (the Y-axis direction). The rail fixing portion 24C is a plate having a width (a Y-axis dimension) smaller than the mount portion 24A and that is arranged to be parallel to the mount portion 24A.

The rail 22 extending in the elongated direction of the frame 24 and the stator 26 are arranged on the rail fixing portion 24C so as to be adjacent to each other with respect to the width direction (the Y-axis direction) of the frame 24. An extending length (a dimension in the moving direction of the slider) of the rail 22 and the stator 26 is equal to each other. The rail 22 and the stator 26 are firmly fixed to the rail fixing portion 24C and accordingly, a position relationship between the rail 22 and the stator 26 with respect to the frame 24 is maintained to be accurate.

The rail 22 has an elongated substantially rectangular columnar shape having rectangular end surfaces. The rail 22 has recesses 22A on its respective two long side surfaces. Projections formed on an inner surface of a guide groove 13A of a rail guide 13 included in the slider 10 are fitted to the recesses 22A. The rail guide 13 and the guide groove 13A will be described later. The rail 22 is fitted to the guide groove 13A of the rail guide 13 of the slider 10 that is arranged on the rail 22 so that the rail 22 functions as a guide member that guides the slider 10 along the rail 22 and the stator 26.

The stator 26 has an elongated substantially rectangular columnar shape having rectangular end surfaces like the rail 22. A plurality of armature coils 25 are fixed to the stator 26 to be embedded therein and arranged along the elongated direction of the stator 26. In the linear conveyer 1, a current supplied to the armature coils 25 is controlled and accordingly, the slider 10 mounted to the stationary module 20 moves along the rail 22 and the stator 26 by the linear motor driving.

A plurality of sensor boards 30 are arranged on a long-side surface of the stationary module 20 to cover an outer side surface of the support portion 24B that is closer to the rail 22. The sensor boards 30 are arranged in the moving direction of the slider 10 and fixed to the support portion 24B such that the plate surfaces thereof face toward the width direction. The sensor boards 30 constitute a linear scale that detects a position of the slider 10 in cooperation with magnetic scales 17A, 17B, 17C included in the slider 10 that will be described later.

As illustrated in FIG. 3, each of the sensor boards 30 includes three magnetic sensors 31A, 31B, 31C that are arranged at certain intervals in the vertical direction. The magnetic sensors 31A, 31B, 31C are Hall elements or MR elements that can detect the magnetic scales 17A, 17B, 17C that will be described later. The magnetic sensors 31A, 31B, 31C are arranged on each sensor board 30 in the same arrangement positions. The magnetic sensors 31A, 31B, 31C are arranged on the sensor board 30 so as to correspond to the magnetic scales 17A, 17B, 17C, respectively, when the slider 10 is mounted on the stationary module 20.

As illustrated in FIGS. 2 and 3, a plate member 32 is arranged on a side of the long side surface of the stationary module 20 and extends in the elongated direction of the support portion 24B to cover a side surface of the support portion 24B. The plate member 32 rises from the mount portion 24A and each end of the plate member 32 is fixed to the mount portion 24A and the support portion 24B. The plate member 32 includes a first plate portion 32A and a second plate portion 32B. The first plate portion 32A has a plate surface extending in the vertical direction to be parallel to the plate surface of the sensor board 30. The second plate portion 32B slightly protrudes outwardly from a lower end of the first plate portion 32A and extends downwardly. The plate member 32 is a protection member that protects the slider 10 from coming in contact with the sensor boards 30 when the slider 10 is mounted on the stationary module 20.

Two connectors 27 are mounted on an outer side with respect to the sensor board 30 and at a height corresponding to the second plate portion 32B of the plate member 32. The connectors 27 are arranged in the vertical direction and one of the connectors 27 is connected to the armature coils 25 to supply electric power to the armature coils 25 and another one of the connectors 27 is connected to the sensor board 30. A hole is formed in a portion of the second plate portion 32B that corresponds to the connectors 27 and the connectors 27 are seen from the outside of the stationary module 20 through the hole. This enables the connectors 27 to be connected to corresponding connectors.

(Configuration of Slider)

Figure 4:
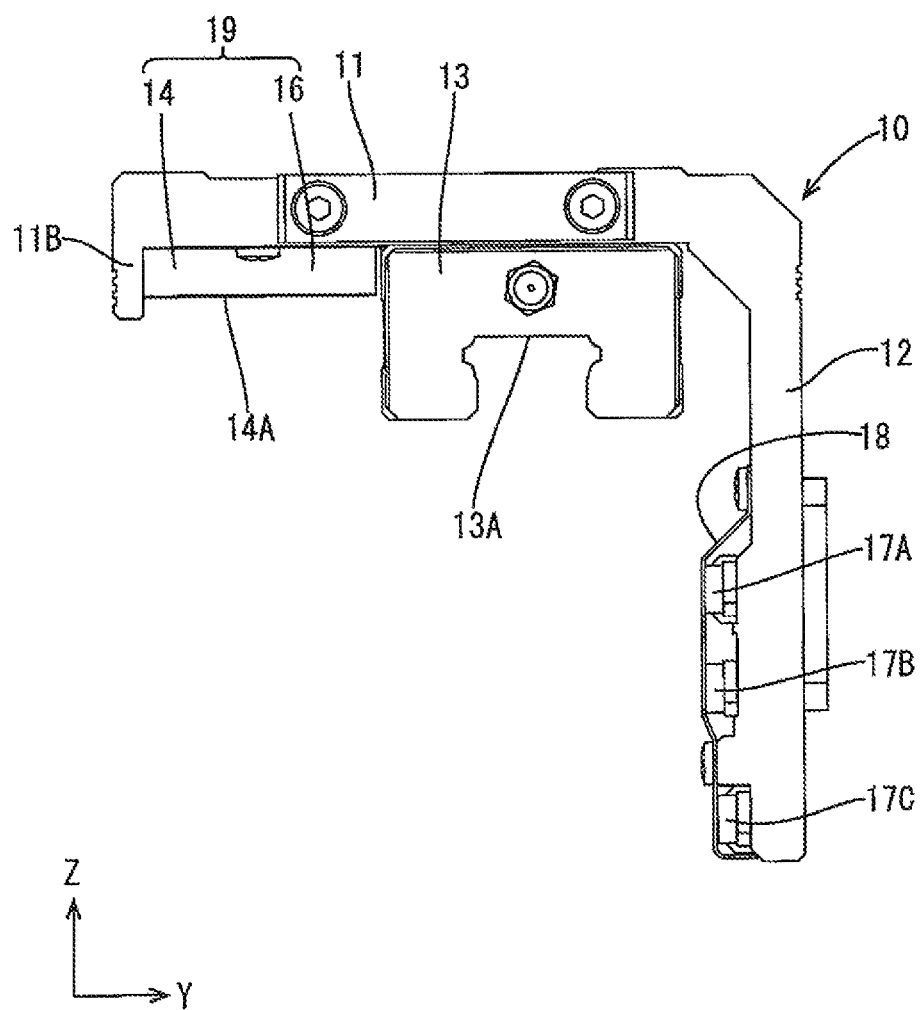
FIG. 4 is a side view of the slider.

A configuration of the slider 10 that moves along the rail 22 of each of the linear conveyance units 4A, 4B will be described. In the following description, the X-axis direction corresponds to the right and left direction, the moving direction or the elongated direction of the slider 10, the Y-axis direction corresponds to the front and rear direction or a width direction of the slider 10, and the Z-axis direction corresponds to the vertical direction or a height direction of the slider 10. As illustrated in FIG. 4, the slider 10 has a substantially L-shape seen from its side. The slider 10 includes a rectangular upper plate portion 11 and a rectangular side plate portion 12. The upper plate portion 11 is positioned above the rail 22 and the stator 26 and the side plate portion 12 is positioned to face a side surface of the frame 24 on which the sensor boards 30 are provided, when the slider 10 is mounted to the stationary module 20.

Figure 5:
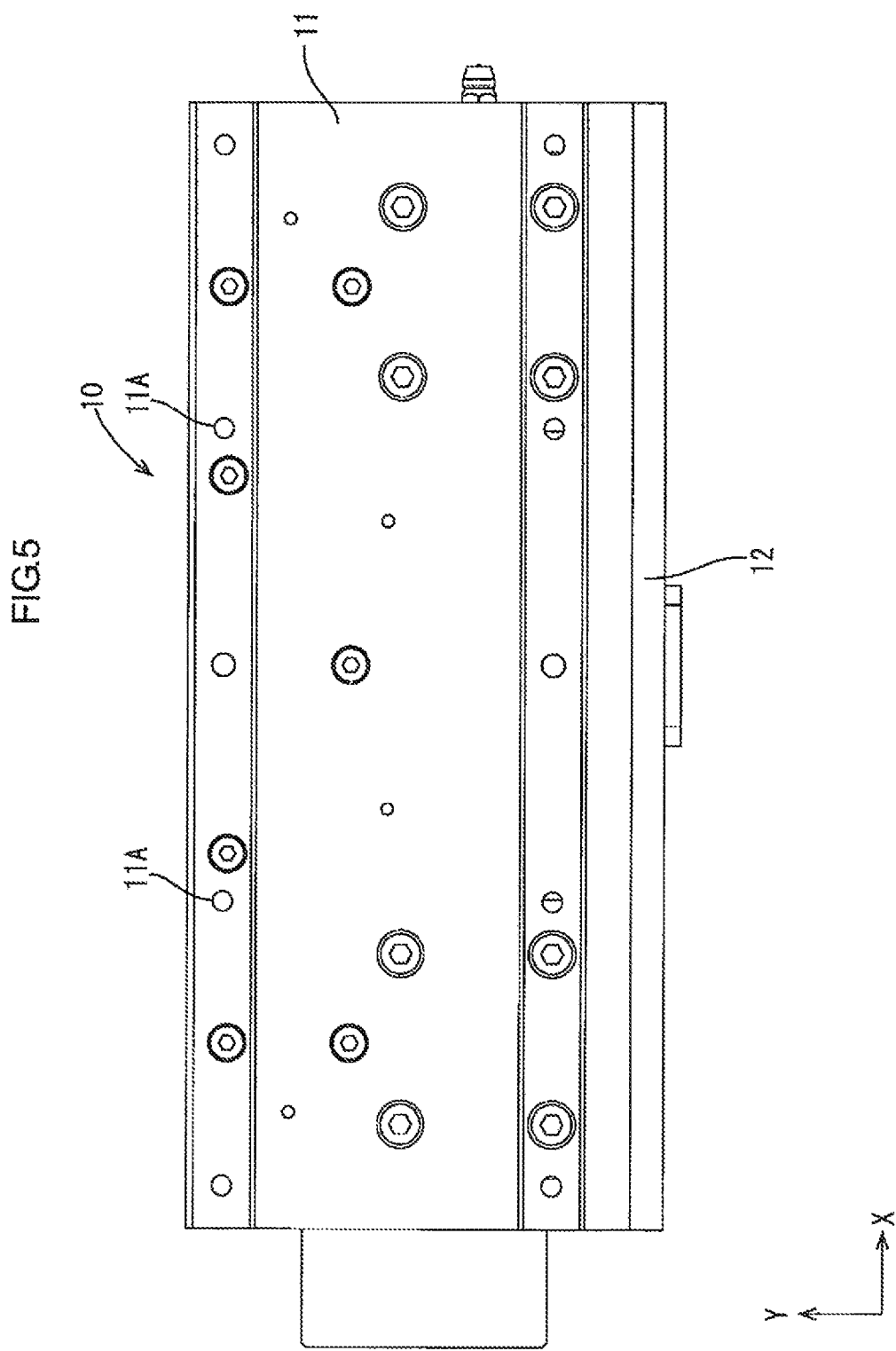
FIG. 5 is a top-surface side plan view of the slider.

As illustrated in FIG. 5, the upper plate portion 11 has mounting holes 11A in its upper surface. A part that is to be placed on the slider 10 and conveyed is mounted to the slider 10 with the mounting holes 11A.

Figure 6:
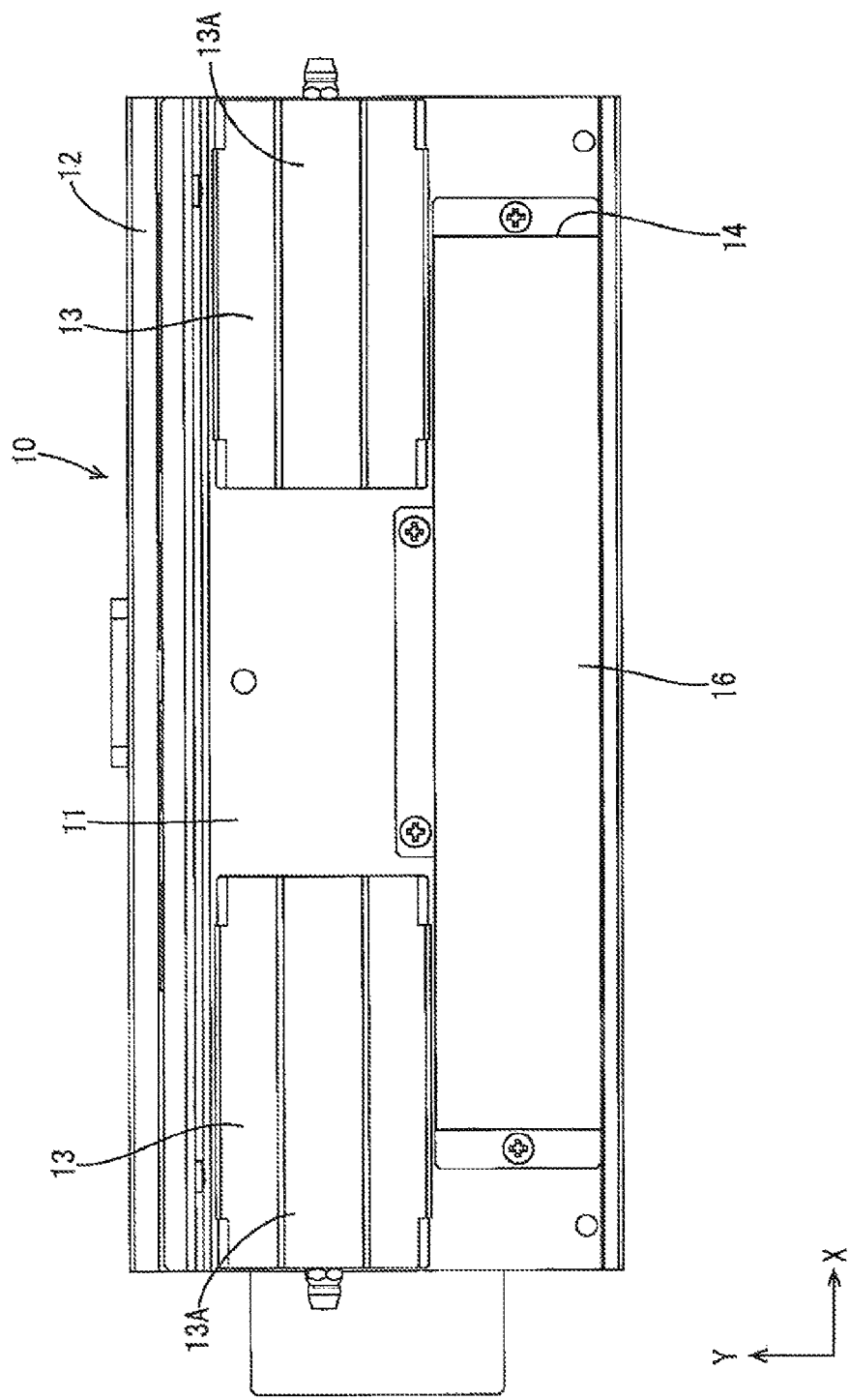
FIG. 6 is a rear-surface side plan view of the slider.

As illustrated in FIG. 6, the upper plate portion 11 includes two rail guides 13 on its rear surface and the rail guides 13 extend in the moving direction of the slider 10. The two rail guides 13 are arranged in the respective end portions with respect to the elongated direction of the slider 10. Each of the rail guides 13 has the guide groove 13A that is open downwardly and extends in the elongated direction of the rail guide 13 or the moving direction of the slider 10. The rail 22 is fitted to the guide groove 13A, and a plurality of balls arranged in and along the guide groove 13A come in contact with the rail 22. Accordingly, the slider 10 moves by rotation of the balls.

Figure 9:
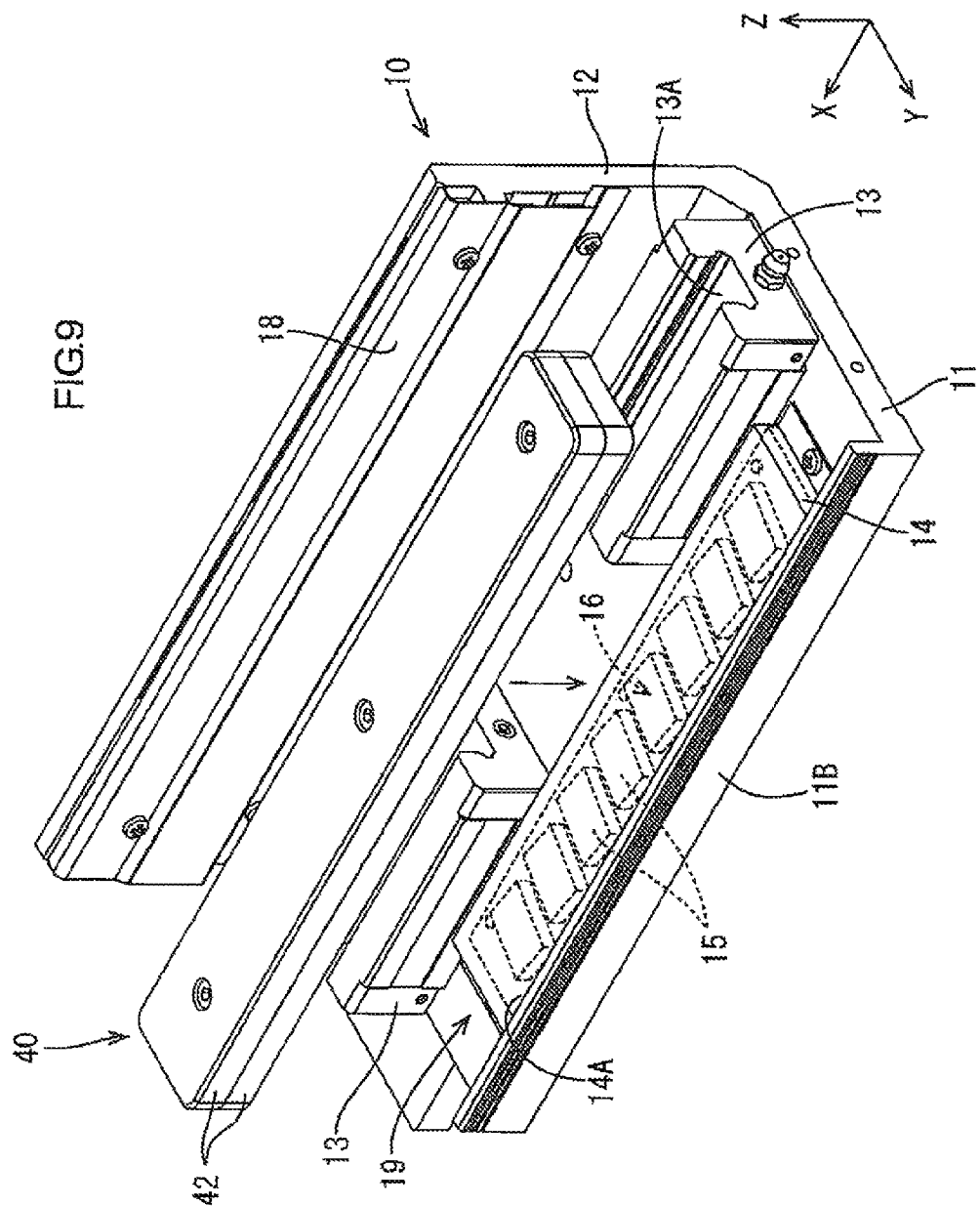
FIG. 9 is a perspective view illustrating the cover that is attached to the slider.

A plurality of permanent magnets 15 are arranged on the rear surface of the upper plate portion 11 along the long side direction (the right and left direction) of the upper plate portion 11 (see FIG. 9). The permanent magnets 15 are covered with a mover cover 14. The permanent magnets 15 generate magnetic poles of the mover 16. The mover cover 14 is fixed to the upper plate portion 11 by screws. The mover cover 14 has a flat surface 14A that covers the permanent magnets 15 and is parallel to a plate surface of the upper plate portion 11 (see FIG. 4). The mover 16 and the mover cover 14 are included in a mover component 19.

The side plate portion 12 extends from one of the two end portions of the upper plate portion 11 with respect to the width direction. An extending portion 11B extends downwardly from another one of the two end portions that is opposite to the one end (see FIG. 3). The mover 16 and the mover cover 14 are arranged on an inner side with respect to the extending portion 11B. The extending portion 11B protects the side portions of the mover 16 and the mover cover 14 that are on an outer side.

As illustrated in FIG. 3, the side plate portion 12 includes three magnetic scales 17A, 17B, 17C on its rear surface or its inner surface and the magnetic scales 17A, 17B, 17C are arranged in the vertical direction. The magnetic scales 17A, 17B, 17C extend in the right and left direction (the longitudinal direction) of the slider 10 and are covered with a scale cover 18 that is fixed to the side plate portion 12. Each of the magnetic scales 17A, 17B, 17C includes a back yoke and a magnet such as a neodymium magnet that is attached to the back yoke.

While the slider 10 is mounted on the stationary module 20, the magnetic scales 17A, 17B, 17C face the respective magnetic sensors 31A, 31B, 31C arranged on the sensor board 30 correspondingly. The magnetic sensors 31A, 31B, 31C on the stationary module 20 detect the respective facing magnetic scales 17A, 17B, 17C and according to the detection, certain signals are output from the sensor board 30 to detect the position of the slider 10.

The slider 10 having the above configuration is arranged such that the upper plate portion 11 of the slider 10 is parallel to the rail fixing portion 24C of the stationary module 20 (see FIG. 3) and the guide groove 13A of the rail guide 13 is fitted on the rail 22 of the stationary module 20. Accordingly, the slider 10 is mounted on the stationary module 20. The slider 10 that is mounted on the stationary module 20 slides along the rail 22 that is fitted to the guide groove 13A and moves along the stationary module 20 in the right and left direction or the extending direction of the linear conveyance units 4A, 4B.

(Configuration of Cover)

Figure 7:
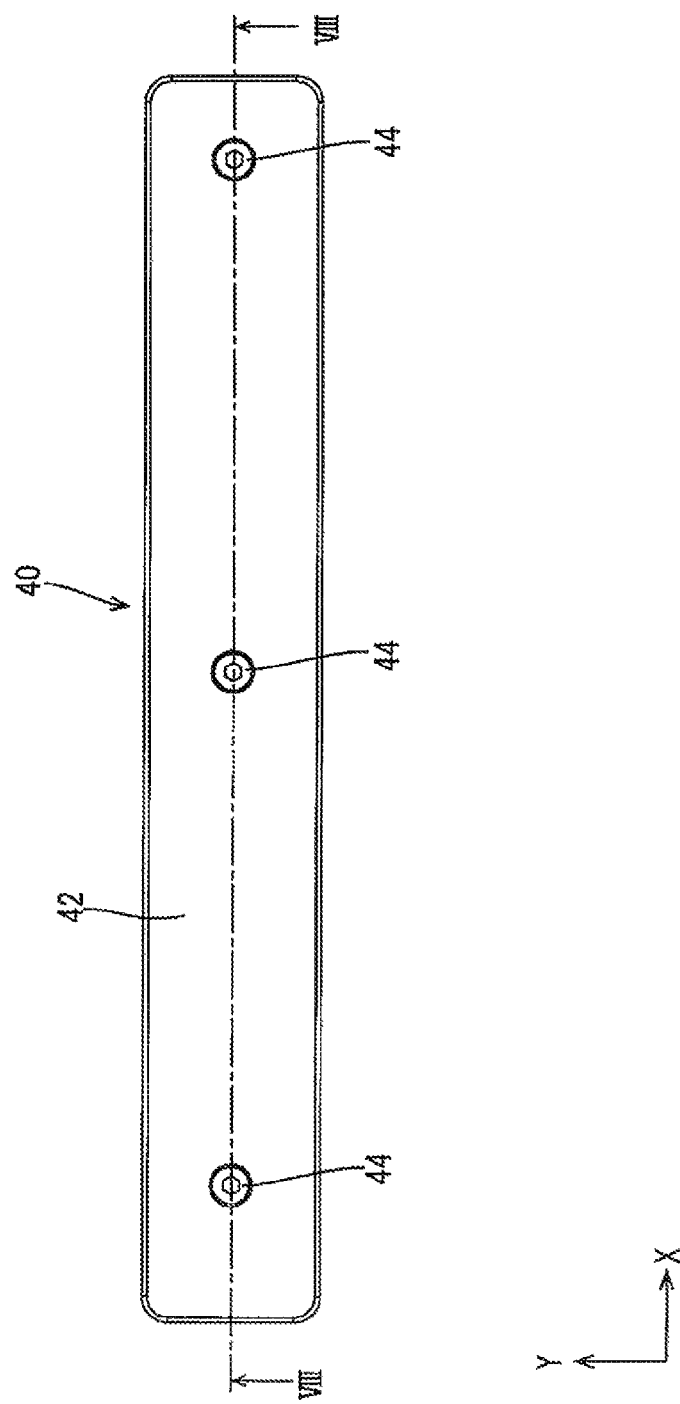
FIG. 7 is a plan view of a cover.
Figure 8:
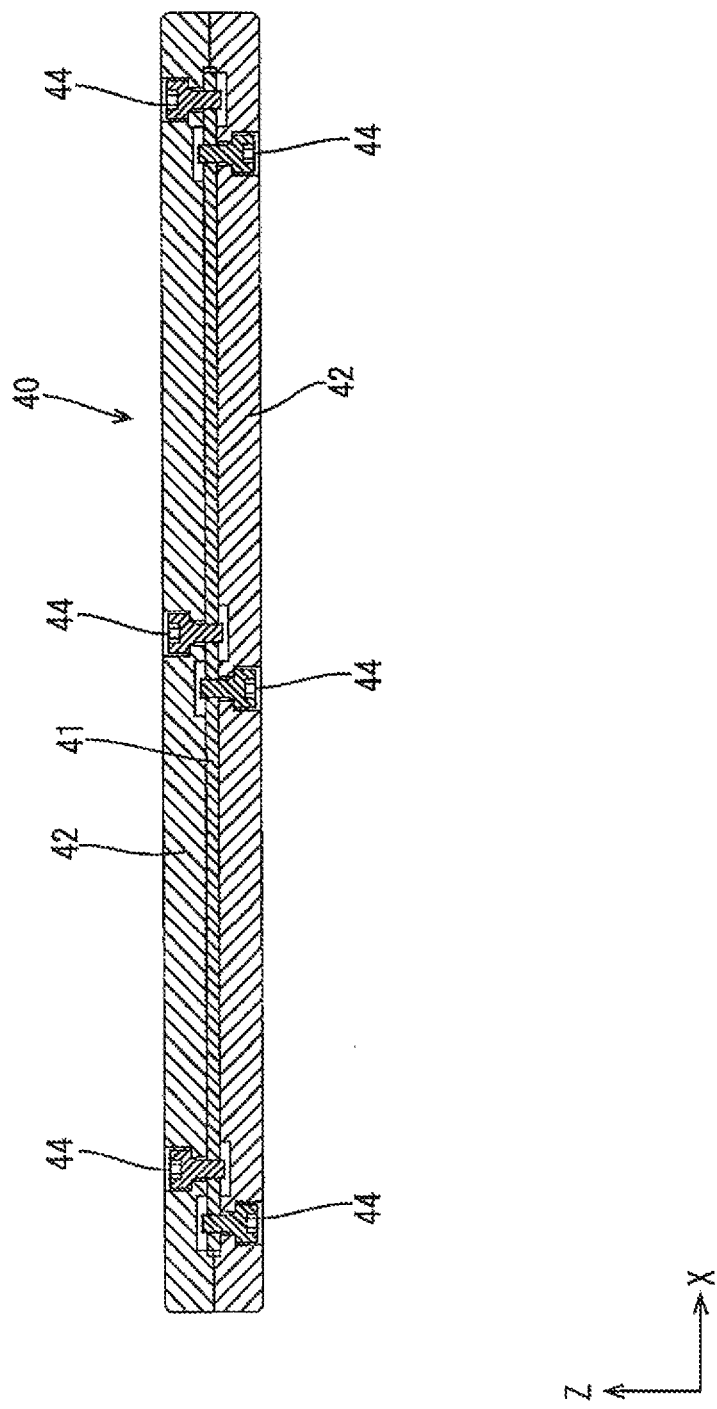
FIG. 8 is a cross-sectional view illustrating a cross-sectional configuration of the cover taken along a VIII-VIII line in FIG. 7.

A configuration of a cover 40 for a linear conveyer that is detachably attached to the slider 10 will be described. As illustrated in FIGS. 7 to 9, the cover 40 has a substantially flat rectangular parallelepiped shape having rectangular end surfaces. The cover 40 has a length dimension (an X-axis dimension) and a width dimension (a Y-axis dimension) that are substantially equal to a length dimension and a width dimension of the flat surface 14A of the mover cover 14, respectively. The cover 40 has a thickness dimension (a Z-axis dimension) that is greater than a dimension of an air gap between the mover cover 14 and the stator 26.

As illustrated in FIG. 8, the cover 40 includes a magnetic plate (an example of a magnetic member) 41 and a pair of casings (an example of a non-magnetic member) 42 that sandwiches the magnetic plate 41 therebetween. The magnetic plate 41 is made of a steel plate and the casings 42 are made of a slippery synthetic resin that is a non-magnetic material, and the magnetic plate 41 and the casings 42 have a same shape and a same size. The magnetic plate 41 and the casings 42 are fixed together by bolts 44 such that their plate surfaces are parallel to each other. Distal ends of the bolts 44 are screwed into screw holes formed in the magnetic plate 41 and a head of each bolt 44 is embedded into a counterbore hole so as not to project from the surface of the casing 42.

(Attachment and Detachment of the Cover)

Figure 10:
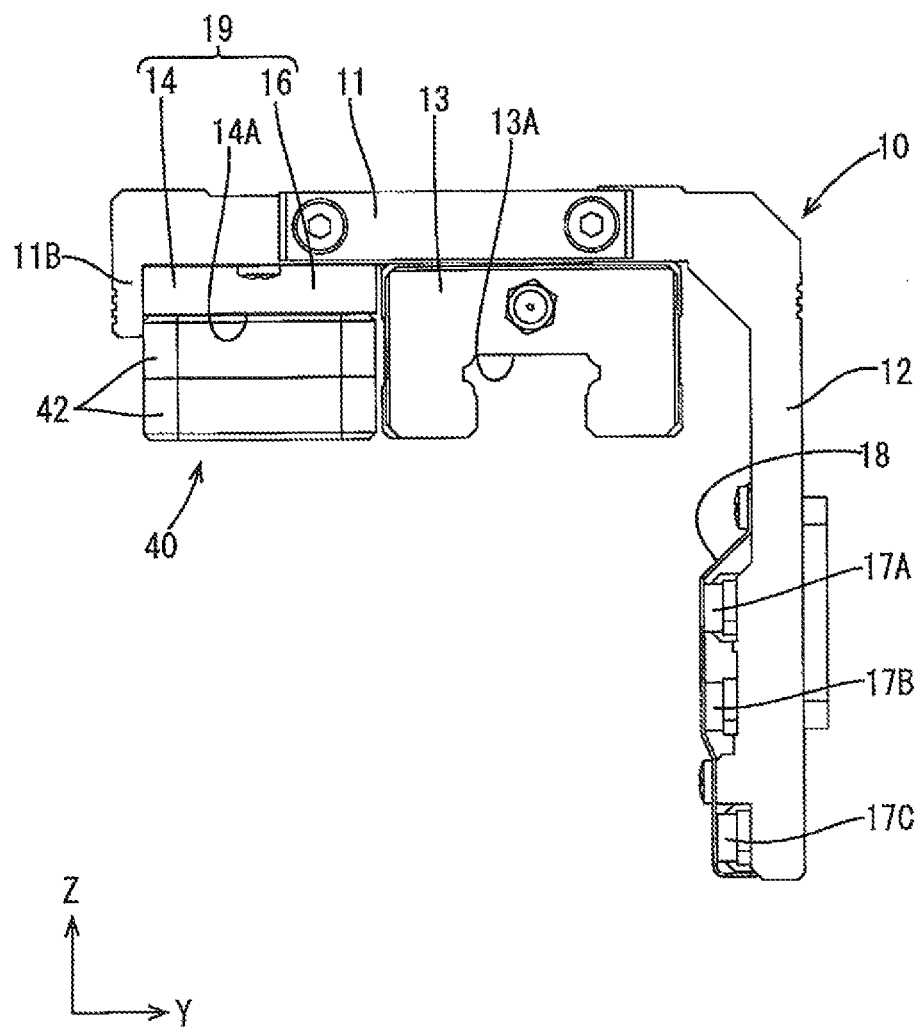
FIG. 10 is a side view illustrating the slider to which the cover is attached.
Figure 11:
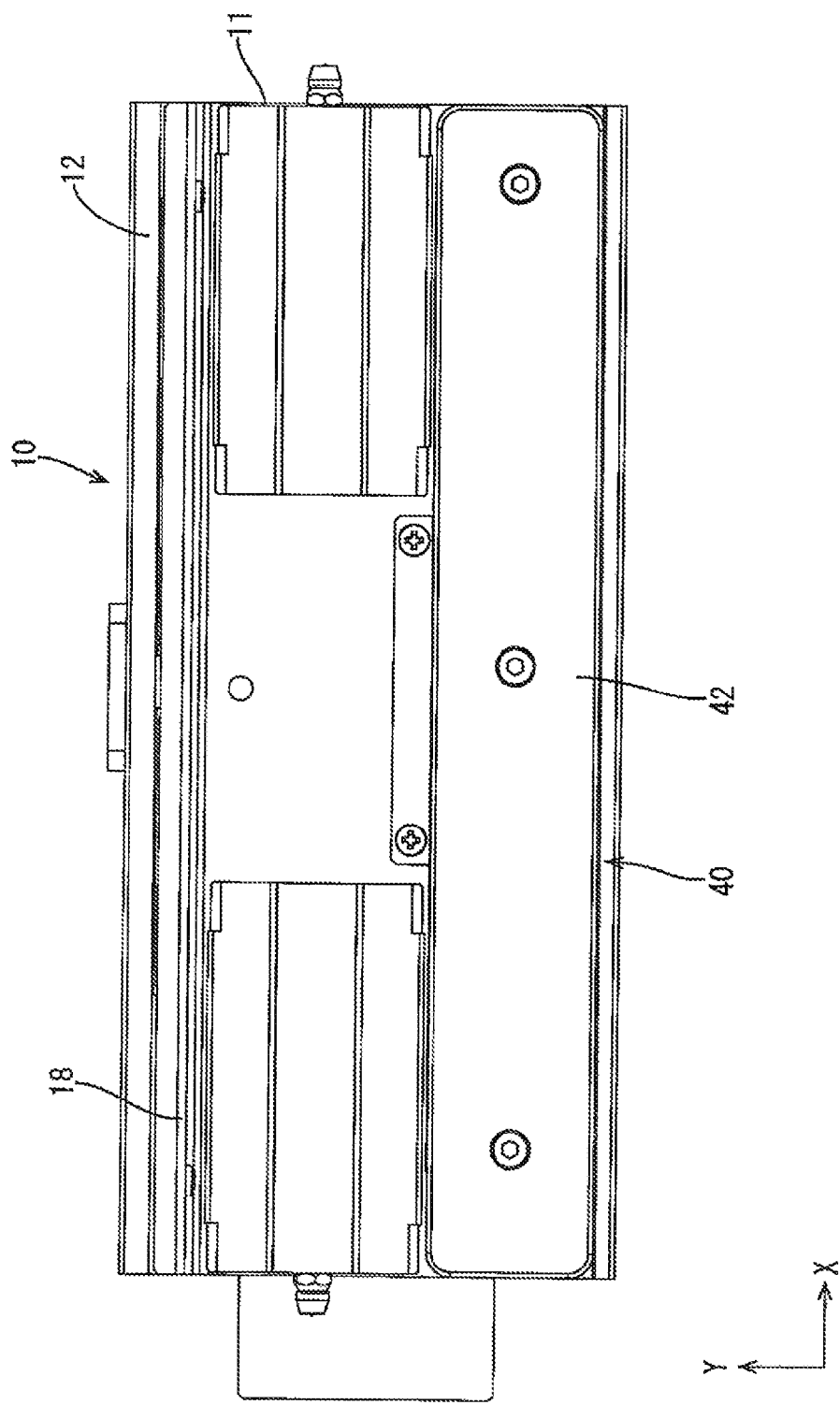
FIG. 11 is a rear-surface side plan view of the slider to which the cover is attached.

Steps of attachment and detachment of the cover 40 having the above configuration to and from the slider 10 will be described. The cover 40 is attached to the slider 10 with using a magnetic attractive force (represented by an arrow in FIG. 9) generated between the magnetic plate 41 of the cover 40 and the mover 16 of the slider 10. If the cover 40 comes closer to the mover 16, the cover 40 is attracted to the mover 16 by the magnetic attractive force. As illustrated in FIGS. 10 and 11, the cover 40 is adhered to the mover cover 14 such that a plate surface of the casing 42 of the cover 40 that faces the mover cover 14 and the flat surface 14A of the mover cover 14 are in surface contact with each other.

As illustrated in FIG. 10, while the cover 40 is adhered to the mover cover 14, the casing 42 of the cover 40 is located between the mover 16 of the slider 10 and the magnetic plate 41 of the cover 40. This separates a magnetic pole face of the mover 16 from the magnetic plate 41. A distance between the magnetic pole face of the mover 16 and the magnetic plate 41 is substantially equal to a thickness dimension of one of the casings 42. The magnetic attractive force generated between the magnetic pole face of the mover 16 and the magnetic plate 41 is inversely proportional to the square of the distance between the magnetic pole face of the mover 16 and the magnetic plate 41. Therefore, the thickness dimension of the casing 42 is varied to effectively set the magnetic attractive force therebetween and a frictional force caused by the sliding between the cover 40 and the mover cover 14. With such a configuration, the cover 40 is attached to the mover 16 having powerful permanent magnets with using the magnetic attractive force and also the mover 16 and the cover 40 easily slide with each other.

Figure 12:
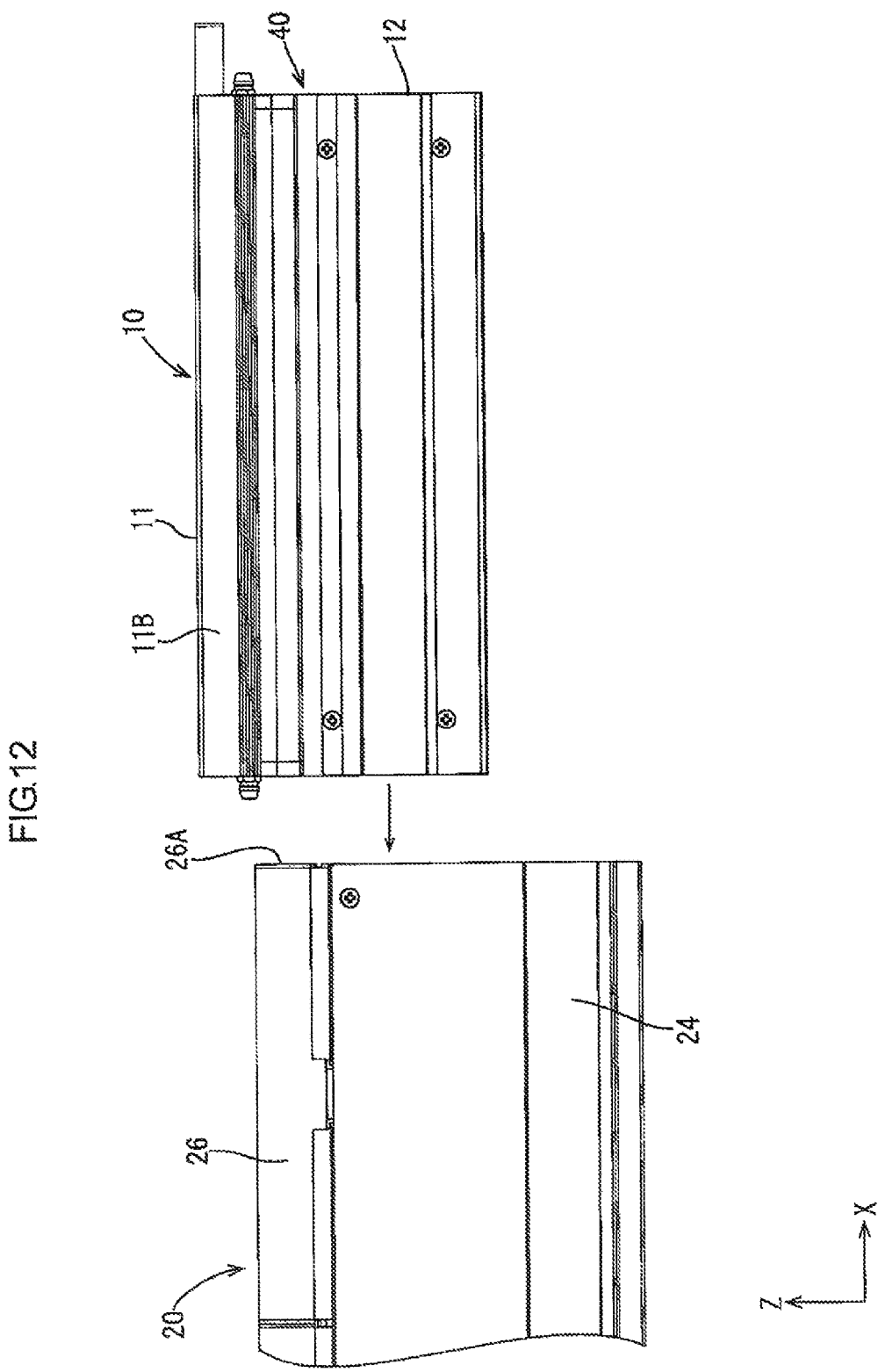
FIG. 12 is a front side view illustrating the slider to which the cover is attached and that is mounted to the stationary module.

The thickness dimension of the cover 40 is much greater than the air gap dimension between the mover cover 14 and the stator 26. As illustrated in FIG. 10, when the cover 40 is attached to the flat surface 14A of the mover cover 14, a lower surface of the cover 40 and a lower surface of the rail guide 13 are at a substantially same level with respect to the vertical direction (the Z-axis direction). As illustrated in FIG. 12, in mounting the slider 10 where the cover 40 is attached to the stationary module 20, an outer end portion of the rail guide 13 of the slider 10 is positioned to correspond to an end portion of the rail 22 and in such a condition, the cover 40 is in contact with an end portion 26A of the stator 26.

Figure 13:
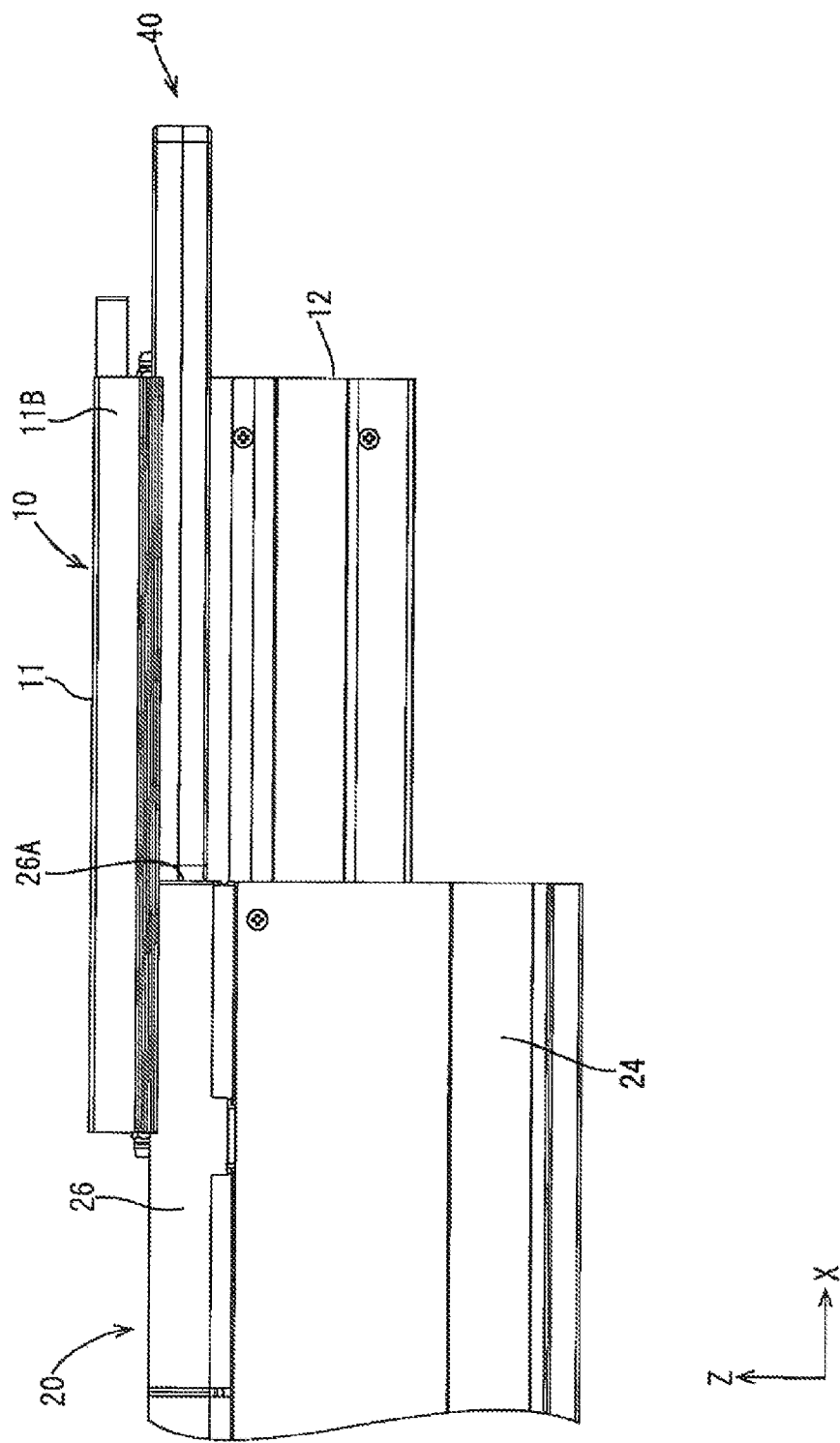
FIG. 13 is a front side view illustrating the slider to which the cover is attached and that is mounted to the stationary module.

As illustrated in FIG. 13, the guide groove 13A of the slider 10 is fitted on the rail 22 and as the slider 10 slides on the rail 22 along the elongated direction of the rail 22 (the X-axis direction). The cover 40 that is in contact with the end surface 26A of the stator 26 is pushed by the end surface 26A of the stator 26. As the slider 10 slides along an arrangement direction in which the magnetic poles of the mover 16 are arranged (the X-axis direction), the cover 40 is pushed by the end surface 26A of the mover 16. Therefore, the end surface 26A stops the cover member 40 from moving and only the slider 10 moves. Accordingly, the cover 40 and the mover cover 14 are separated from each other and a part of the flat surface 14A of the mover cover 14 is uncovered and the uncovered portion sequentially faces the stator 26 with having the air gap therebetween. Thus, when the slider 10 is mounted to the stationary module 20 completely, an entire area of the flat surface 14A of the mover cover 14 faces the stator 26. This naturally eliminates the magnetic attraction force between the mover 16 and the cover 40 and the cover 40 is detached from the slider 10.

In sliding the slider 10 on the rail 22 to detach it from the stationary module 20, as the mover cover 14 moves away from the stator 26, the flat surface 14A of the mover cover 14 is gradually uncovered. The cover 40 is positioned corresponding to the mover cover 14 of the slider 10 that is to be detached from the stationary module 20 so that the cover 40 faces the uncovered portion of the flat surface 14A. Accordingly, when the slider 10 slides on the rail 22 to be detached from the stationary module 20, the cover 40 is adhered to the uncovered portion of the flat surface 14A sequentially, and the uncovered portion is easily covered with the cover 40. According to this embodiment, in attaching and detaching the slider 10 to and from the stationary module 20, the flat surface 14A of the mover cover 14 is effectively covered with and protected by the cover 40. Therefore, in attaching and detaching the slider 10 to and from the stationary module 20, a hand or a finger is less likely to be caught between the stator 26 and the mover 16 and this enhances safety. Further, steel components such as bolts or tools are less likely to be adhered to the flat surface 14A of the mover cover 14. This enhances safety.

The cover 40 is attached to and detached from the slider 10 easily only by the sliding of the slider 10 along the arrangement direction in which the magnetic poles of the mover 16 are arranged. The cover 40 is attached to and detached from the slider 10 quite easily and workability of attaching and detaching of the cover 40 is further improved.

Advantageous Effects of First Embodiment

As described before, according to this embodiment, the cover 40 for a linear conveyer is attached to the mover cover 14 of the slider 10 so as to cover the mover 16, and the slider 10 including the cover 40 slides along the arrangement direction in which the magnetic poles of the mover 16 so that the cover 40 is detached from the slider 10. Compared to a configuration where the cover is attached to the slider with bolts, the cover 40 is easily detached from the slider 10 in a short time. The cover 40 is easily attached to the slider 10 in a short time only by sliding the slider 10 along the arrangement direction in which the magnetic poles of the mover 16 are arranged.

In mounting the slider 10 on the rail 22, the cover 40 that is in contact with the end surface 26A of the stator 26 is pushed by the end surface 26A as the slider 10 moves. Even if the slider 10 slides on the rail 22, the end surface 26A stops the cover 40 from moving. Therefore, as the slider 10 slides on the rail 22, the cover 40 is detached from the slider 10. The portion of the magnetic pole face of the mover 16 that is uncovered by detaching of the cover 40 sequentially faces the stator 26. Further, in detaching the slider from the rail 22, the cover 40 is placed near the slider 10 corresponding to the mover cover 14, and the slider 10 slides toward the cover 40. Accordingly, in the slider 10 that is being detached from the rail 22, a portion of the magnetic pole face of the mover 16 (the flat surface 14A) that is away from the stator 26 is sequentially covered with the cover 40. Thus, in mounting and detaching the slider 10 on and from the module 20, the magnetic pole face of the mover 16 is less likely to be uncovered. Accordingly, in mounting and detaching the slider 10 on and from the module 20, a finger or a hand is less likely to be caught between the slider 10 and the stationary module 20 and a metal component such as a bolt is less likely to be attracted to the mover 16. This enhances safety. As described before, with the cover 40 for a linear conveyer according to the present embodiment, workability and safety in mounting and detaching the slider 10 on and from the module 20 is enhanced. The cover 40 is detached from the slider 10 at the same time as the slider 10 is mounted on the rail 22, and the cover 40 is attached to the slider 10 at the same time as the slider 10 is detached from the rail 22. Thus, the cover 40 is attached to and detached from the slider 10 safely and easily at the same time as the slider 10 is detached from and attached to the rail 22.

According to the present embodiment, the cover 40 includes the magnetic plate 41 between the pair of casings 42. With such a configuration, one of the casings 42 is always located between the mover 16 and the magnetic plate 41 regardless of which one of the side surfaces of the cover 40 is adhered to the flat surface 14A of the mover cover 14 of the slider 10. Therefore, it is not necessary to confirm the side of the cover 40 is attached to the slider 10, and this improves workability in attaching the cover 40 to the slider 10.

According to the present embodiment, the cover 40 is attached to the slider 10 by using a magnetic force and the magnetic attractive force is generated between each magnetic pole face of the mover and the magnetic member of the cover. Therefore, the cover is easily attached to the slider only by placing the cover on the magnetic pole face of the slider. The magnetic attractive force that acts on the magnetic plate 41 can be adjusted by altering a material of the magnetic plate 41 or altering a thickness of the casing 42 of the cover 40. Accordingly, frictional resistance caused by the sliding between the mover 16 and the cover 40 is adjusted and ease of mounting and detaching the cover 40 on and from the mover 16 can be adjusted. If the frictional resistance between the mover 16 and the cover 40 is adjusted to be great, the cover 40 is less likely to be attached and detached from the slider 10, and if the frictional resistance is adjusted to be small, the cover 40 is easily attached to and detached from the slider 10.

A distance between the magnetic member and the magnetic pole face is determined, and therefore, the magnetic attractive force is not excessively great and the cover is detached from and attached to the slider with an effective force. Further, a distance between the magnetic member and the magnetic pole face is determined by sandwiching the non-magnetic member therebetween. Therefore, the magnetic attractive force is not excessively great and the cover is detached from and attached to the slider with an effective force.

Second Embodiment

A second embodiment of the present technology will be described with reference to FIGS. 14 to 17. According to the second embodiment, configurations of a cover 140 and a slider 110 and the mounting of the cover 140 are different from those in the first embodiment. Other components are similar to those in the first embodiment, and configurations, operations, and effects thereof will not be described.

Figure 14:
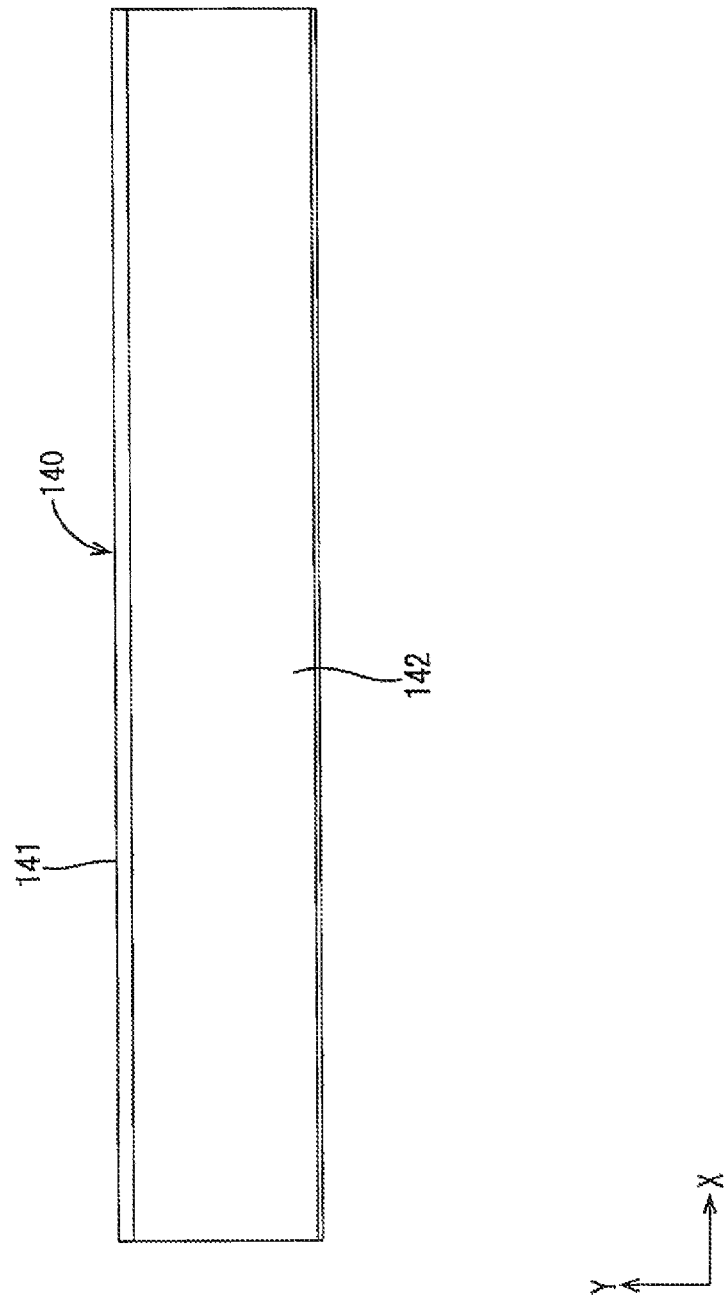
FIG. 14 is a plan view illustrating a cover according to a second embodiment.
Figure 15:
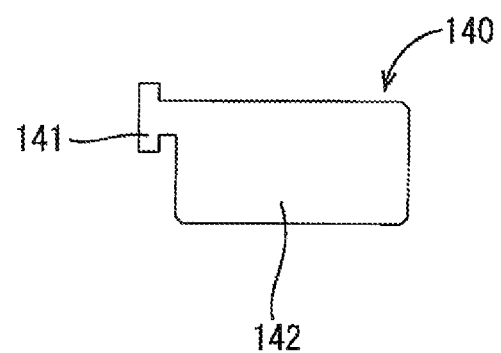
FIG. 15 is a side view illustrating the cover according to the second embodiment.

As illustrated in FIGS. 14 and 15, the cover 140 has a substantially flat rectangular parallelepiped shape having rectangular end surfaces similar to the cover 40 according to the first embodiment. The cover 140 has a length dimension (an X-axis dimension) and a width dimension (a Y-axis dimension) that is substantially equal to a length dimension and a width dimension of the flat surface 14A of the mover cover 14, respectively (see FIG. 17). The cover 140 has a thickness dimension (a Z-axis dimension) that is greater than a dimension of an air gap between the mover cover 14 and the stator 26 similar to the first embodiment. The entire cover 140 is a non-magnetic member 142 made of a synthetic resin.

As illustrated in FIGS. 14 and 15, the cover 140 includes a fitting projection (an example of a fitting portion) on its side surface so as to project outwardly from the side surface and extend in an elongated direction (the right and left direction, the X-axis direction) of the cover 140. An elongated dimension of the fitting projection 141 is substantially equal to an elongated dimension (the right and left direction dimension) of the cover 140. As illustrated in FIG. 15, the fitting projection 141 has two extended portions on its upper and lower ends and has a substantially lateral T-shape seen from a side. The extended portions also extend in the elongated direction of the cover 140.

Figure 16:
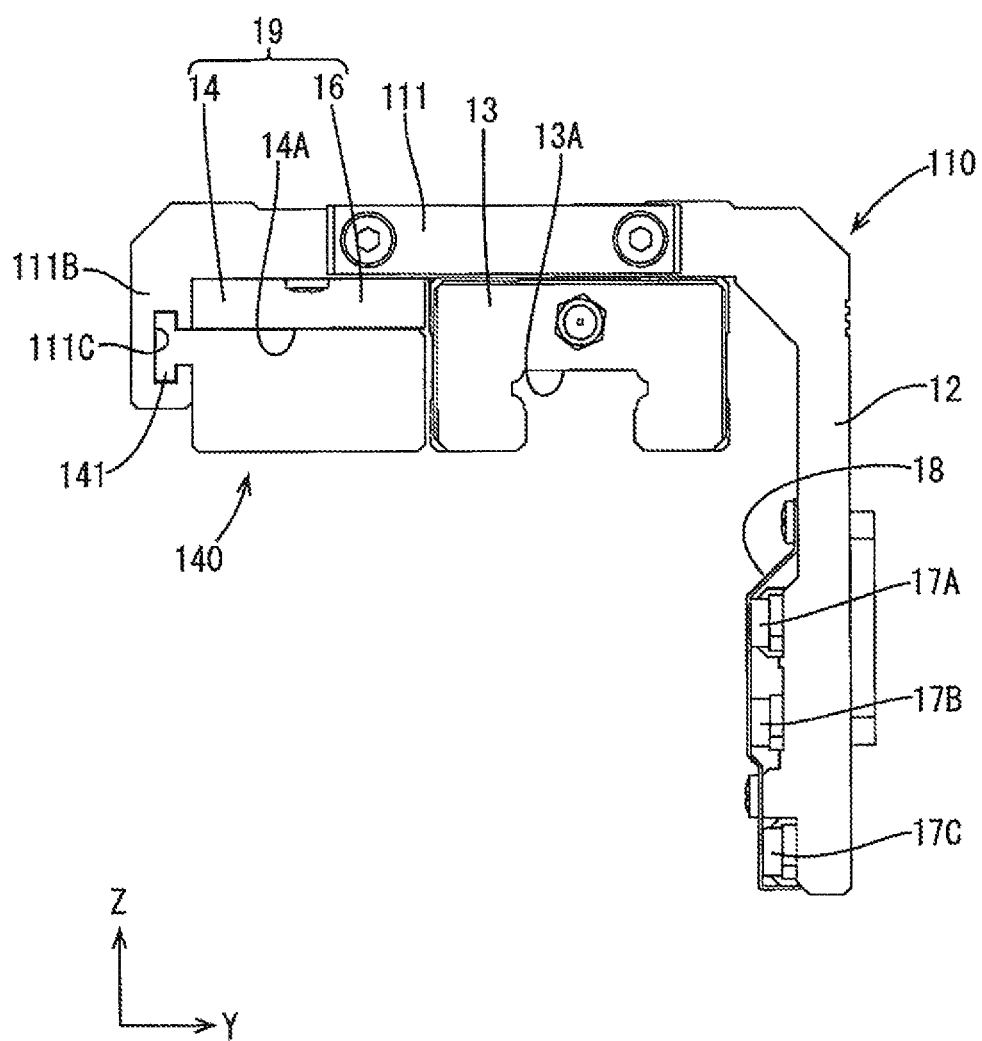
FIG. 16 is a side view illustrating a slider to which the cover is attached according to the second embodiment.
Figure 17:
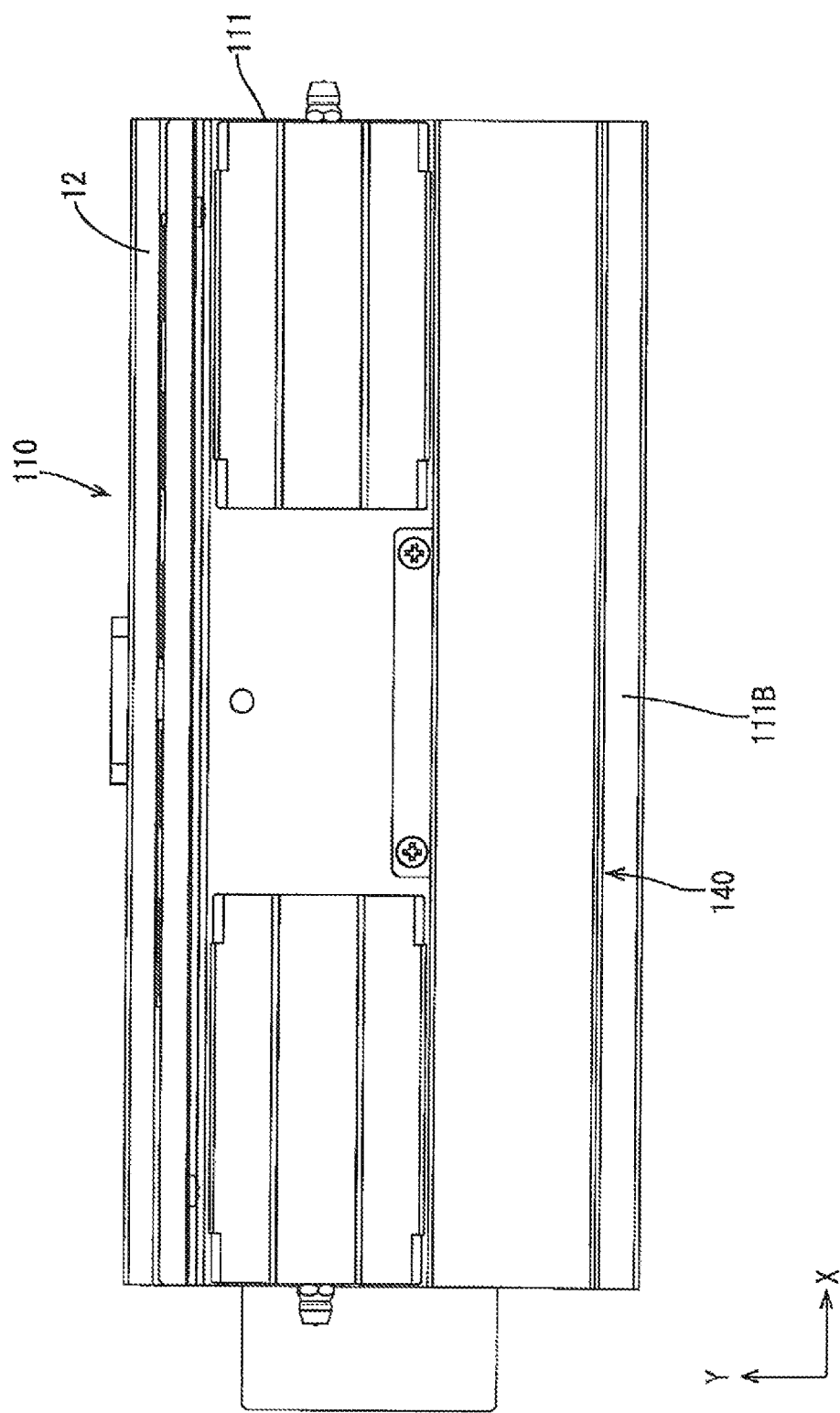
FIG. 17 is a rear side plan view illustrating the slider to which the cover is attached according to the second embodiment.

As illustrated in FIG. 16, the slider 110 according to the second embodiment includes an extending portion 111B extending from an upper plate portion 111 and the extending portion 111B has a fitting groove (an example of a groove) 111C that is a recessed groove fitted to the fitting projection 141 of the cover 140. The fitting groove 111C is open toward the side plate portion 12 and extends in the longitudinal direction (the right and left direction) of the slider 110. The fitting groove 111C is open toward outer side at its both side ends (two ends of the slider 110 with respect to the longitudinal direction or the right and left direction of the slider 110). With such a configuration, the fitting projection 141 is fitted to the fitting groove 111C from both side ends (the right side and the left side) of the slider 110.

As illustrated in FIG. 16, a shape and a size of an inner wall surface of the fitting groove 111C with a side surface view is substantially equal to a shape and a size of the fitting projection 141. Therefore, the fitting projection 141 of the cover 140 is fitted on the fitting groove 111C of the slider 110 without having a gap therebetween.

The cover 140 having the above configuration is attached to the slider 110 as described below. The fitting projection 141 has the extended portions extending in the vertical direction as described before. Therefore, if the fitting projection 141 is fitted to the fitting groove 111C from its opening side (a side from the rail guide 13) or in the vertical direction, the extended portions of the fitting projection 141 hits an opening edge of the fitting groove 111C close to the rail guide 13. Therefore, the fitting projection 141 cannot be fitted to the fitting groove 111C from the opening side of the fitting groove 111C. To fit the fitting projection 141 to the fitting groove 111C, one of the two elongated ends of the fitting projection 141 is fitted to one of the two elongated end-side openings of the fitting groove 111C. Then, the slider 110 slides along the elongated direction of the fitting groove 111C (the longitudinal direction or the right and left direction of the slider 110), and accordingly, the slider 110 is detached from the stationary module 20 and slides onto the cover 140. Then, the cover 140 is attached to the slider 110.

The extended portions of the fitting projection 141 prevents the cover 140 that is attached to the slider 110 from dropping off through the front side opening of the fitting groove 111C. Therefore, the cover 140 is less likely to be separated from the slider 110 even after the slider 110 with the cover 140 is detached from the stationary module 20. Similar to the case in which the cover 140 is attached to the slider 110, the cover 140 can be detached from the slider 110 only by sliding the slider 110 along the elongated direction of the fitting groove 111C (the right and left direction of the slider 110) to mount the slider 110 to the stationary module 20.

As described before, according to the present embodiment, the cover 140 does not include a magnetic member, and this simplifies the configuration of the cover 140 and reduces a weight of the cover 140. If the cover 140 is made to be hollow, the weight of the cover 140 is further reduced.

Other Embodiments

The present technology is not limited to the description as described above with reference to the drawings. For example, the present technology may include the following embodiments.

(1) In the above embodiments, as the slider slides, the cover is detached from the slider. However, the detachment of the cover is not limited to the above as long as the cover is detached from the slider at the same time as the slider is mounted on the rail. The cover is not necessarily detached from the slider 110 by the sliding of the slider 110 along its longitudinal direction but may be detached from the slider vertically with respect to the magnetic pole face of the mover.

(2) In the above embodiments, as the detector that detects a position of the slider, the magnetic scales are provided on the slider and the magnetic sensors are provided on the stationary module. However, for example, an optical type position detector including optical scales on the slider and optical sensors on the stationary module may be used.

(3) In the above embodiments, when the slider is mounted on the rail, the cover comes in contact with the end surface of the stator. As the slider slides on the rail, the cover is pushed by the end surface of the stator and detached from the slider. A portion of the stationary module that comes in contact with the cover and pushes the cover may be an end portion of any one of the components of the stationary module and is not limited to the end portion of the stator.

(4) In the first embodiment, the casing of the cover is positioned between the mover and the magnetic plate of the cover so that the magnetic polar face of the mover and the magnetic plate are spaced from each other. The present technology is not limited to this configuration. The casing may not be arranged between the magnetic polar face of the mover and the magnetic plate as long as the casing comes in contact with the mover so that the magnetic polar face of the mover and the magnetic plate are spaced from each other.

(5) In the first embodiment, a part of the cover is constituted by the magnetic member and the cover is attached to the slider by a magnetic force. However, the cover may have any configuration as long as the cover is attached to the slider that slides relative to the cover along the arrangement direction in which the magnetic poles of the mover are arranged.

(6) In the second embodiment, the cover has the fitting projection and the slider has the fitting recess. However, the cover may have a fitting recess and the slider may have a fitting projection.

(7) In the above embodiments, the mover component includes the mover and the mover over. However, the mover component may not include the mover cover. With such a configuration, the cover and the mover may slide with each other directly without having the mover member therebetween.

The embodiments according to the present technology are described in detail. However, the above description is only examples and does not limit a scope of the claims. The technology described in the claims includes modifications and variations of the above described specific examples.

According to the technology, when the slider is mounted on the rail, the rail guide of the slider is fitted on the end of the rail and the slider moves along the rail. Therefore, the slider can be mounted on the rail with the cover being attached thereto. The slider to which the cover is attached is mounted on the rail and moves along the rail, and this makes the cover come in contact with the end portion of the stationary module and be detached from the slider. Accordingly, the magnetic face of the mover is less likely to be uncovered during the operation of mounting the slider to the stationary module. A hand or a finger is less likely to be caught between the slider and the stationary module and steel members such as bolts are less likely to be attracted to the mover. This enhances safety.

The slider can be mounted on the rail by moving the slider along the arrangement direction in which the magnetic poles of the mover are arranged after fitting the rail guide of the slider onto the end portion of the rail. With such a configuration, when the slider is mounted on the rail, the cover comes in contact with the end portion of the stationary module and is pushed by the end portion of the stationary module. Thus, as the slider slides along the rail, the cover is stopped from moving by the contact with the end portion of the stationary module and the cover is gradually detached from the slider. Therefore, the magnetic pole face of the mover is less likely to be uncovered even during the operation of mounting the slider on the stationary module. This enhances safety in the operation of mounting the slider on and detaching the slider from the stationary module.

The invention claimed is:

1. A cover for a linear conveyer, the linear conveyer including a stationary module including a rail extending linearly, a stator including armature coils fixed to the rail, a slider including a mover component having magnetic poles arranged linearly, and a rail guide fitted to the rail, the slider sliding from an end surface of the rail along an elongated direction of the rail to be arranged on the rail and moving on the rail by a linear motor,
the cover being attached to the slider to cover a magnetic pole face of the mover component of the slider, the cover having a thickness so as to come in contact with an end portion of the stationary module when the slider is mounted on the rail, and the cover being detached from the slider by movement of the slider and contact with the end portion of the stationary module.

2. The cover according to claim 1, wherein the mover component and the cover relatively slide along an arrangement direction in which the magnetic poles of the mover component are arranged so that the cover is detached from the slider.

3. The cover according to claim 1, further comprising a magnetic member, wherein the cover is attached to the slider by a magnetic attractive force generated between the magnetic member and the mover component.

4. The cover according to claim 3, further comprising a non-magnetic member, wherein the non-magnetic member is in contact with the mover component so that the mover component and the magnetic member are separated from each other.

5. The cover according to claim 4, wherein the non-magnetic member is located between the mover component and the magnetic member so that the magnetic member and the mover component are separated from each other.

6. The cover according to claim 5, wherein the non-magnetic member includes non-magnetic members in a pair, and the magnetic member is sandwiched between the non-magnetic members.

7. The cover according to claim 1, wherein
one of the cover and the slider has a groove extending along an arrangement direction in which the magnetic poles of the mover are arranged,
another one of the cover and the slider has a fitting portion that is fitted to the groove, and
the cover is attached to the slider by fitting of the groove and the fitting portion.

8. A linear conveyer comprising the cover according to claim 1.

9. A slider assembly for a linear conveyer, the slider assembly comprising:
a stationary module including:
a rail extending linearly; and
a stator including armature coils, and
a slider including:
a mover component including magnetic poles arranged linearly and having a magnetic pole face;
a rail guide fitted to the rail; and
a cover attached to cover the magnetic pole face of the mover component, the cover having end portions one of which is in contact with an end portion of the stationary module so that the cover is detached from the slider by movement of the slider.

10. The slider assembly according to claim 9, wherein the stator and the cover have an elongated shape, and a longitudinal end portion of the cover is in contact with the end portion of the stationary module with respect to an elongated direction of the stator of the stationary module.

11. The slider assembly according to claim 9, wherein the mover component includes a mover and a mover cover arranged to cover the mover, and
the cover is arranged such that a surface of the cover is in contact with a mover cover surface that covers the mover.

12. The slider assembly according to claim 9, wherein the mover component and the stator have a gap therebetween, and
a thickness dimension of the cover is greater than the gap between the mover component and the stator.

13. The slider assembly according to claim 11, wherein the cover includes a magnetic member and a non-magnetic member,
the cover is attached to the mover by a magnetic attractive force that is generated between the magnetic member and the mover such that the non-magnetic member is in contact with the mover cover surface.

14. The slider assembly according to claim 9, wherein one of the cover and the slider has a groove extending along an arrangement direction in which the magnetic poles of the mover component are arranged,
another one of the cover and the slider has a fitting portion that is fitted to the groove, and
the cover is attached to the slider by fitting of the groove and the fitting portion.

15. The slider assembly according to claim 10, wherein when a part of the rail guide of the slider is mounted to the rail of the stationary module, one elongated end portion of the cover is in contact with the elongated end portion of the stationary module and another elongated end portion of the cover that is opposite to the one elongated end portion is detached from the mover component.

16. The slider assembly according to claim 9, wherein a part of the mover component that is mounted on the stationary module faces the stator without being covered with the cover, the part of the mover component facing the stator having a gap therebetween, and
another part of the mover component that is spaced from the stationary module is covered with the cover.

17. A method of detaching a cover from a slider for a linear conveyer including a stationary module and the slider, the method comprising:
fitting the cover to a mover component of the slider to cover a magnetic pole face of the mover component;
placing the slider including the cover such that a rail guide of the slider is fitted to a rail of the stationary module;
the placing leading a portion of the stationary module to come in contact with the cover;
sliding the slider on the rail of the stationary module with the portion of the stationary module in contact with the cover; and
the sliding leading the slider to slide along the rail and the cover to be detached from the slider.

18. The method according to claim 17, wherein in the sliding, the portion of the stationary module pushes the portion of the cover as the slider slides along the rail and only the slider moves and this detaches the cover from the slider.

19. The method according to claim 17, wherein in the fitting, the cover is fitted to the mover component by a magnetic attractive force generated between the magnetic pole face and a magnetic member included in the cover.

20. The method according to claim 17, wherein in the fitting, the cover is fitted to the mover component by fitting a groove of one of the cover and the slider to a fitting portion of another one of the cover and the slider.

* * * * *